United States Patent [19]

Kirkpatrick

[11] Patent Number: 4,905,581
[45] Date of Patent: Mar. 6, 1990

[54] DOUGHBALL PRESS CONTROL

[75] Inventor: John Kirkpatrick, Lahabra, Calif.

[73] Assignee: Lawrence Equipment Company, South El Monte, Calif.

[21] Appl. No.: 157,223

[22] Filed: Feb. 18, 1988

[51] Int. Cl.⁴ .................... A23L 1/10; A47J 44/00
[52] U.S. Cl. ........................... 99/353; 99/337; 99/349; 100/45
[58] Field of Search .............. 99/353, 337, 342, 349, 99/373, 377, 379, 372; 100/45

[56] References Cited

U.S. PATENT DOCUMENTS

| | | | |
|---|---|---|---|
| 3,118,512 | 1/1964 | Fishburne | 100/45 X |
| 3,363,080 | 1/1968 | Lamb et al. | 99/337 X |
| 3,565,015 | 2/1971 | Jorgensen | 99/349 X |
| 4,414,887 | 11/1983 | Orii | 100/45 |
| 4,444,094 | 4/1984 | Baker et al. | 99/349 X |
| 4,601,238 | 7/1986 | Davis, Jr. et al. | 100/45 |

Primary Examiner—Stephen Marcus
Assistant Examiner—Christine A. Peterson
Attorney, Agent, or Firm—Lyon & Lyon

[57] ABSTRACT

A doughball processing apparatus having cooperating press plates includes workpiece sensing means for determining the presence or absence of a workpiece on a conveyor belt for delivery to the processing position between the press plates. A control system is provided to manipulate the various components of the apparatus to insure the movable press plate does not contact the conveyor belt in the absence of a workpiece, while at the same time, insuring that belt indexing during the operation cycle is unaltered.

6 Claims, 3 Drawing Sheets

DOUGHBALL PRESS CONTROL

BACKGROUND OF THE INVENTION

The present invention relates to the pressing of doughballs into flat shapes, such as, for example, tortillas. More particularly, the present invention relates to a method and apparatus for controlling the operation of a mechanical press employed for forming doughballs into tortillas.

Machines for the commercial production of tortillas from doughballs are well known. One such machine is shown and described in U.S. Pat. No. 4,668,524, granted May 26, 1987 to the inventor hereof and assigned to the assignee of this patent application. In the machine described in this patent, doughballs are magazine-fed onto a conveyor belt that is indexed in sequence with the operation of a reciprocably movable plate of a mechanical press to force the doughballs between the movable plate and the fixed plate of such press into the flattened tortilla shapes.

It is desirable in the commercial production of tortillas that they undergo a degree of parbaking during the pressing operation. Accordingly, the press plates are heated to an elevated temperature by electrical heating elements carried thereby. In order to effectively transmit heat from the fixed plate to the pressed dough shells for parbaking purposes, however, the thickness of the conveyor belt must be minimal, typically about .010 inches (10 mils) thick. Also, in order to prevent sticking of the flattened dough to the belt and to obtain effective discharge of the finished product from the belt, the belts have typically been formed of teflon-coated fiberglass material. Both of these characteristics render the belts susceptible to damage.

Moreover, in the operation of the described prior art machine it is desirable that the movable plate be capable of operating continuously, regardless of the existence of doughballs between the plates when the plate is activated downwardly. However, it has been found that the thin conveyor belts in existing equipment deteriorate rapidly due primarily to the fact that particulate material such as dough particles can migrate between the belt and the fixed plate and there can become hardened due to pressure applied by the plates and to heat by the heating elements. Thus, when, during the absence of doughballs on the belt, the plates are brought together, the hardened particles impact the belt to the point, in the most severe case, of penetrating the belt thickness. Holes produced in the belt in this manner propagate rapidly resulting in the need to change belts frequently.

It is accordingly to the amelioration of the above described problem that the present invention is directed.

SUMMARY OF THE INVENTION

Accordingly, there is provided apparatus for producing flat pastry products, such as tortillas, from doughball workpieces, comprising a press having a reciprocating plate; a conveyor belt operatively positioned with respect to the press to move doughball workpieces to a processing position with respect to the reciprocating plate; means for driving the press plate including means for imparting a compressing stroke thereto; means for moving the conveyor belt with respect to the press plate; means upstream of the press plate for sensing the presence or absence of a workpiece on the conveyor belt for delivery to the processing position and for transmitting a signal in response thereto; and control means for controlling said press plate driving means including means for rendering said compressing stroke imparting means inoperative when said sensing means indicates the absence of a workpiece from said conveyor belt.

It is, accordingly, an object of the invention to provide an improved press apparatus for compressing essentially round doughballs into flat pastry products, such as tortillas.

Another object of the invention is to provide an effective control for the press plate drive to prevent unnecessary full stroke operation thereof in the absence of a doughball workpiece positioned between the press plates for processing.

Yet another object of the invention is to prevent damage to the conveyor belt by unnecessary contact of the moving press plate therewith and, thereby, to extend the effective life of the conveyor belt.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENT

Figure 1:
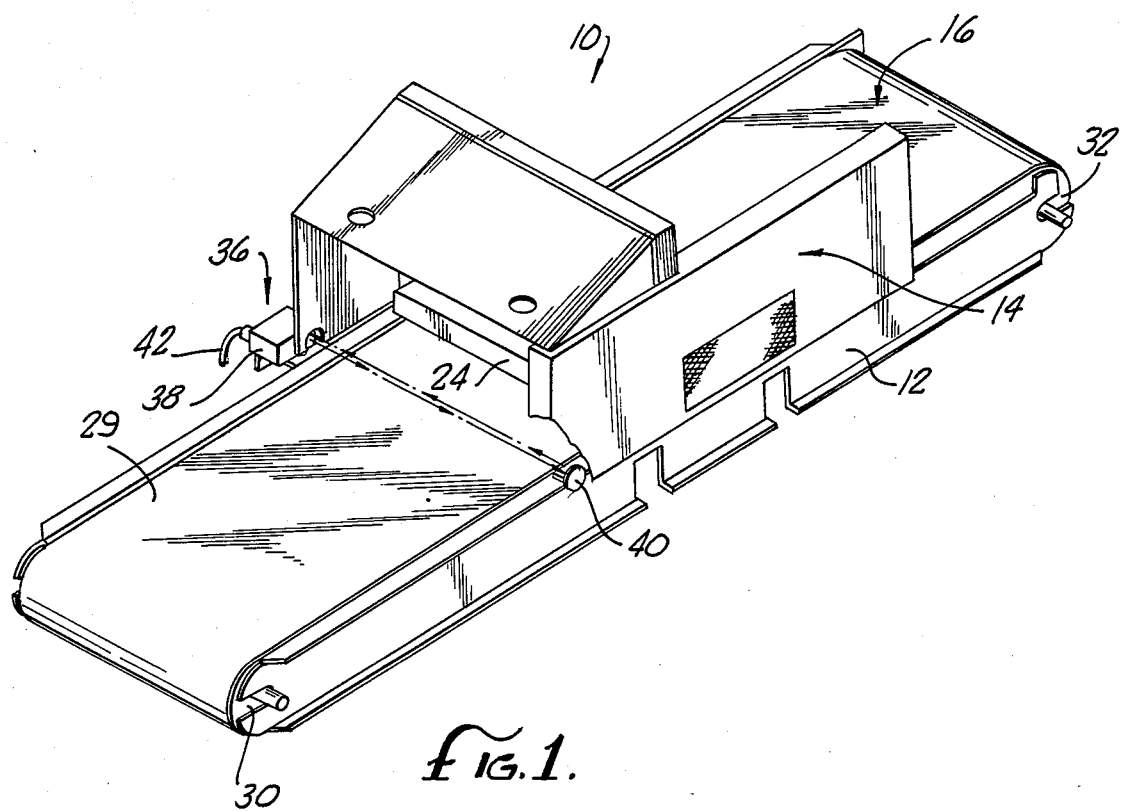
FIG. 1 is a partial perspective representation of a doughball press, equipped for practice of the present invention.

The doughball processing apparatus 10 illustrated in the drawing figures includes a frame structure 12 supporting a press unit 14, a conveyor unit 16, and a loading unit 20. The press unit 14, which is essentially of well known construction, comprises a fixed plate 22 and a movable plate 24 attached to ram 26 that is operated by a hydraulic drive system for compressing doughballs 27 delivered to a processing position 28 between the press plates, as hereinafter described. The press plates 22 and 24 each contain heating elements (not shown) for applying heat to the doughball workpieces 27 during the pressing operation for parbaking purposes prior to delivery of the flattened tortilla shell product to an oven for final baking. The press plates 22 and 24 are, accordingly, heated to a temperature of about 350° F. to 450° F. and operate to parbake the workpieces in order to seal the surfaces thereof. Sealing the exterior surfaces of the workpieces in this manner improves the moisture retention capability of the tortilla shells during final baking. It also eliminates the tacky consistency of the workpiece surfaces to prevent their tendency to otherwise adhere to the operating surfaces of the press plate and conveyor belt, thus to facilitate removal of the tortilla shells from the discharge end of the belt.

The illustrated conveyor unit 16 comprises an endless teflon-coated, fiberglass belt 29 extending between a pair of end rollers 30 and 32, at least one of which is driven for moving the belt in an indexing manner with respect to the press. The conveyor belt 29, as shown in the drawing figures, extends across the upper surface of the fixed press plate 22 and operates to deliver one or more doughballs positioned in laterally extending longitudinally spaced rows on the belt to the processing position 28 between the press plates. Desirably, the belt 29 is formed of a reduced thickness for example, about 0.010 inch to improve the heat transfer properties thereof.

Although the doughball workpieces can be positioned on the belt 29 manually, they are preferably supplied to the conveyor unit 16 by a mechanical loading apparatus 20, comprising by a plurality of laterally aligned transfer tubes 34, only one of which is shown in the drawing. Such loading apparatus is described in detail in U.S. Pat. No. 4,668,524 granted May 26, 1987 to the inventor hereof, the contents of which patent are incorporated herein by reference.

It will be appreciated that, in processing the doughballs 27 into flattened tortilla shells, the preformed, generally spherical doughball workpieces are delivered to the conveyor belt 29 by the transfer tubes 34 while the press unit 14 and conveyor unit 16 are sequenced through their respective operating cycles. In practice the workpieces are, first, delivered to the processing position 28 in the press unit 14 by the stepped or indexed movement of the conveyor unit 16. While the workpieces are momentarily stationary in the processing position 28, the movable plate 24 of press unit 14 is hydraulically reciprocated through one operating cycle with respect to the fixed plate 22 to compress the doughballs into tortilla shells. After the doughballs have been compressed and the movable plate begins its movement upwardly, the conveyor unit is again indexed to step the processed shells forwardly toward the discharge end of the belt and to move a subsequently deposited plurality of doughballs 27 to the processing position 28 in the press unit 14.

In compressing the doughballs into tortilla shells a force ranging from about 400 psi to about 1800 psi is applied to the operating cylinder operating ram 26 whereby the diameter and thickness of the formed shells will be determined by the size and mass of the doughball delivered to the press. Desirably, once operation of the processing apparatus is initiated it continues unattended. Consequently, a problem arises when, for whatever reason, the movable plate 24 of press unit 14 is moved toward the fixed plate 22 without one or more workpieces in the processing position 28. In such instance, the movable plate is caused to contact the thin conveyor belt 29 where, because of an accumulation of dough particles between the conveyor belt and the fixed plate 22, which particles are hard due to the application of heat and repeated pressing forces, there is danger of damage to the belt caused by pressing it against these hardened particles.

In order to alleviate this problem, there is provided a photoelectric sensor apparatus 36 operative to detect the presence or absence of workpieces for delivery to the press unit 14 and, in response to the detected condition, to control the drive system for the movable press plate 24. As shown in the drawing figures, the sensor apparatus 36 comprises a combined photoelectric emitter/receiver 38 and reflector 40 affixed to opposite sides of the frame structure 12 immediately adjacent the processing position 28. The sensor apparatus is capable of transmitting a photoelectric beam transversely of the belt 29 and sufficiently close to the surface thereof as to detect the presence of a doughball 27 regardless of the size thereof. The signal generated in response to the condition detected is transmitted via electric leads 42 to the processing apparatus control system indicated generally as 43 in FIG. 8 where the signal operates, when the absence of a workpiece is detected, to restrict the downward movement of the press plate 24 so that it is prevented from contacting and thereby causing damage to, the conveyor belt 29.

Figure 7:
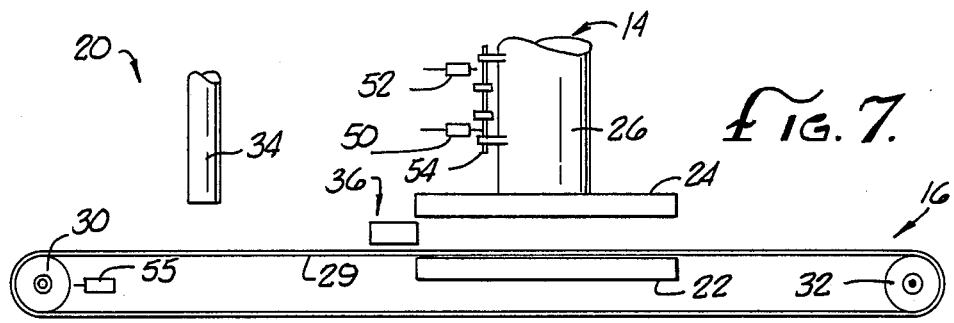
FIG. 7 is a view, similar to FIG. 2, illustrating the location of various switches operative in the practice of the invention.
Figure 8:
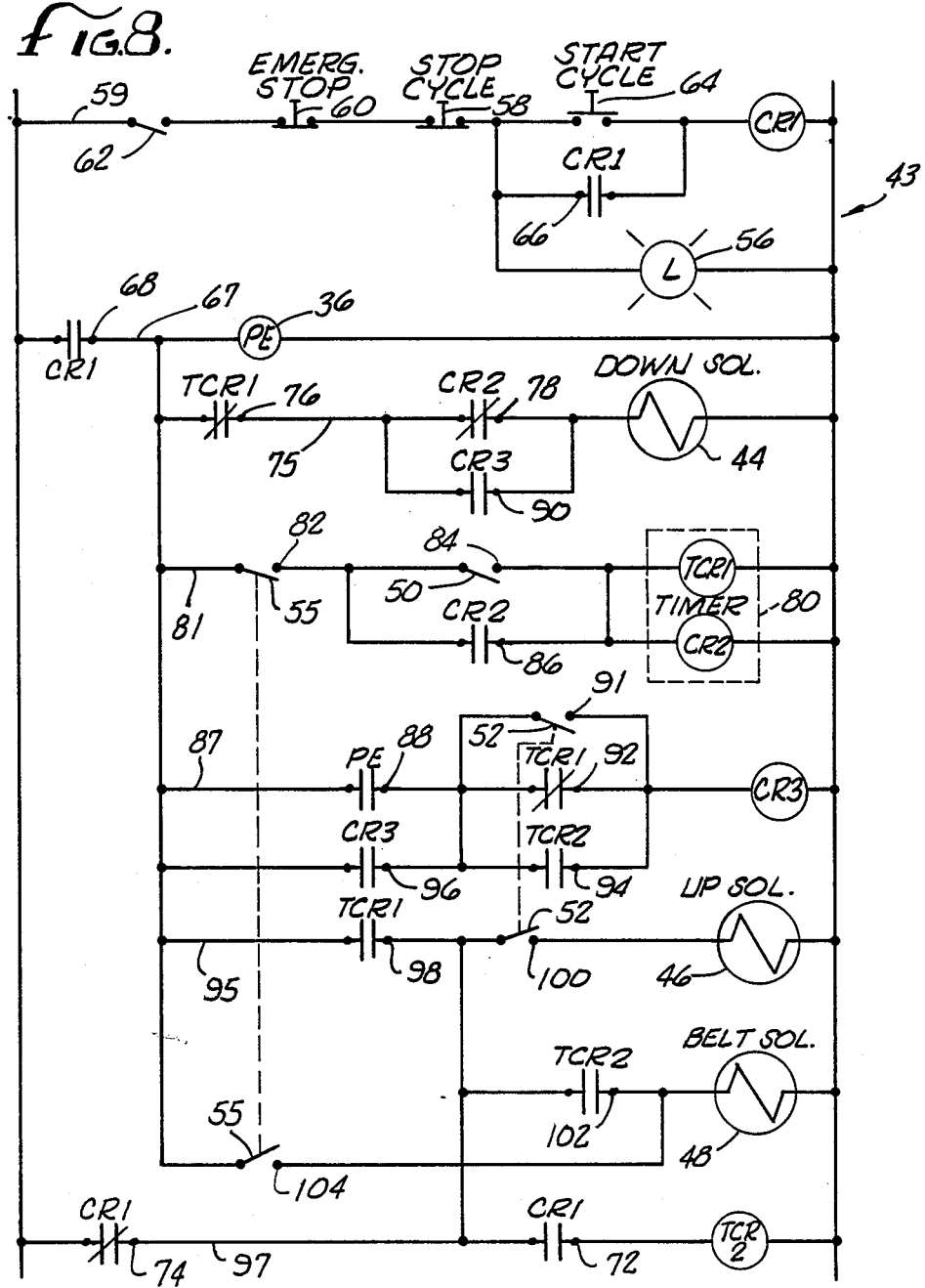
FIG. 8 is a schematic electrical diagram illustrating the apparatus control according to the present invention.

Utilized in the practice of the above described operation, in addition to the photoelectric sensor 36, are various electrically operated components identified with reference to the apparatus schematic of FIG. 7 and the control diagram of FIG. 8. Such components comprise the principal driven elements including three control relays indicated in FIG. 8 as relays CR1, CR2 and CR3; time delay relays indicated as TCR1 and TCR2; press plate-actuating solenoids 44, indicated as "DOWN" solenoid and "UP" solenoid 46, respectively, that control the hydraulic operator for plate 24; and a belt drive solenoid 48, the actuation of which effects indexing of the belt 29 of conveyor unit 16. Equipment condition-indicating limit switches are also employed that include limit switches 50 and 52 associated with the plate-operating ram 26 and actuated by an actuating rod 54 attached thereto to indicate the direction of movement of press plate 24. Limit switch 55, actuated by an appropriate cam on the belt drive as represented schematically in FIG. 7, indicates the drive mode of the conveyor belt 29.

Control of the hereindescribed equipment through its various operating states is undertaken by the system 43, a diagramatic representation of which appears in FIG. 8. Line 59 of the control system diagram contains control relay CR1 connected in series with a plurality of series-connected contacts, the closure of which is required for initiation of the processing cycle sequence. These contacts include those associated with normally-closed switches indicated as "STOP CYCLE" switch 58 and "EMERGENCY STOP" switch 60, respectively. Also included in line 59 are any of a number of automatically actuated contacts associated with various equipment or process safety conditions, which contacts are represented here by the single contact 62 and all of which contacts must be closed before the control relay CR1 can be energized by closure of the start switch 64.

As shown, an indicator light 56 connected in series with the respective condition responsive switches indicates, when illuminated, that all of the prerequisite conditions are satisfied and that the processing sequence can be initiated by depression of the "START CYCLE" switch 64.

Contacts 66 connected in parallel with "START CYCLE" switch 64 enables continued energization of the control relay CR1 following only a momentary closure of the switch 64.

Energization of control relay CR1 closes normally open contacts 68 in line 67 which transmits electric power to, and thereby arms, the photoelectric sensor 36. Energization of control relay CR1 also transmits electric current to the DOWN solenoid 44 in line 75 through the series-connected, normally closed contacts 76 and 78 that are associated with time delay relay TCR1 and control relay CR2, as hereinafter described. Energizing the DOWN solenoid 44 operates to initiate downward movement of the moving plate 24 by the admission of hydraulic fluid in a known manner to the operating cylinder operating ram 26.

Current is passed to timer 80 through contacts 82, once the movable plate 24 has been moved by ram cylinder 26 to a position about one inch removed from the belt 99 and fixed plate 22. Contacts 82 remain closed throughout substantially the entire operating cycle; however, in order to reset the timer 80 following the completion of each cycle, it is caused to be deactuated momentarily by the action of a cam 31 driven with conveyor drive roll 30 that trips limit switch 55 thereby momentarily opening contacts 82 and closing contacts 104 as hereinafter discussed. Actuation of timer 80 energizes control relay CR2 to close contacts 86 in parallel with contacts 84 thereby sealing the relay. It also opens contacts 78 in line 75 to prevent further downward motion of plate 24 unless the photocell 36 has detected the presence of a doughball on the belt 29 for delivery to the processing station 28 between plates 22 and 24. In this regard, it will be appreciated that control relay CR3 in line 87, which is energized upon closure of contacts 88 actuated by the photocell 36, is operative to close contacts 90 disposed in parallel with respect to contacts 78 in line 75 and capable of continuing to energize DOWN solenoid 44 provided there is a workpiece for delivery to the processing station 28.

Besides the parallel connected sealing contacts 96, line 87 also contains the parallel connection of contacts 91, 92 and 94 connected in series between contacts 88 and the control relay CR3. Contacts 91 are normally open contacts associated with limit switch 52 on the operating ram 26 of plate 24 arranged to indicate, when closed, that the plate 24 is in its fully elevated position. Contacts 92 are associated with the time delay relay TCR1 of timer 80. These contacts are normally closed contacts arranged to maintain control relay CR3 energized while the plate 24 moves downwardly and contacts 91 are, accordingly, open. Contacts 94 are normally open contacts actuated by a time delay relay TCR2 in line 97 and arranged to maintain energization of relay CR3 during the period belt 29 undergoes indexing movement. Contacts 94 are set to be energized about 0.2 seconds after the UP solenoid 46 in line 95 is energized and simultaneously with energization of the belt indexing solenoid 48.

Contacts 98 in line 95 are arranged to close upon the expiration of a time delay of about one second following energization of the time delay relay TCR1 of timer 80 to energize UP solenoid 46, provided the plate 24 is not in its full up position as indicated by closure of contacts 100 by limit switch 52. Contacts 102, the closure of which occurs about 0.2 seconds following energization of the time delay relay TCR2, effects actuation of the BELT solenoid 48 to index the belt. The arrangement of these contacts in this manner insures that indexing of the belt 29 will not be initiated until after the plate 24 has begun to move upwardly, thus to be spaced from the surface of the belt before any movement of the belt, and the tortilla carried thereby, occurs.

The arrangement in line 97 of normally open contact 72 and normally closed contact 74 has both a safety and an administrative function in that, if any of the conditioning contacts 58, 60 or 62 in line 59 are opened to deenergize relay CR1, contacts 74 are closed to energize the UP solenoid to move the plate 24 upwardly. Normally open contacts 72 are present in line 97 to insure that time delay relay TCR2 is deenergized following deenergization of control relay CR1.

Limit switch 55 associated with the belt drive mechanism is effective in the operation of the belt drive with contacts 104, being closed when the limit switch 55 indicates that the belt is stationary, its indexing cycle having been completed. Conversely, contacts 82 in line 81 open following completion of the belt indexing cycle to deactuate and thereby reset the timer 80 for reactuation in the next operating cycle.

Figure 2:
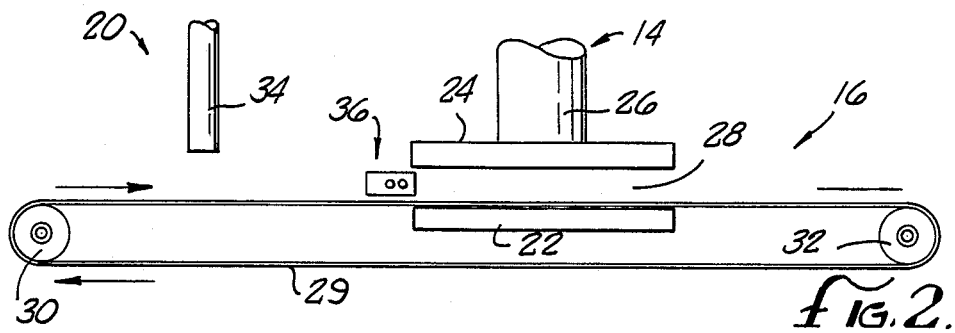
FIGS. 2 through 6 are essentially side elevational schematic views illustrating the apparatus of FIG. 1 in the various phases of an operating cycle.
Figure 3:
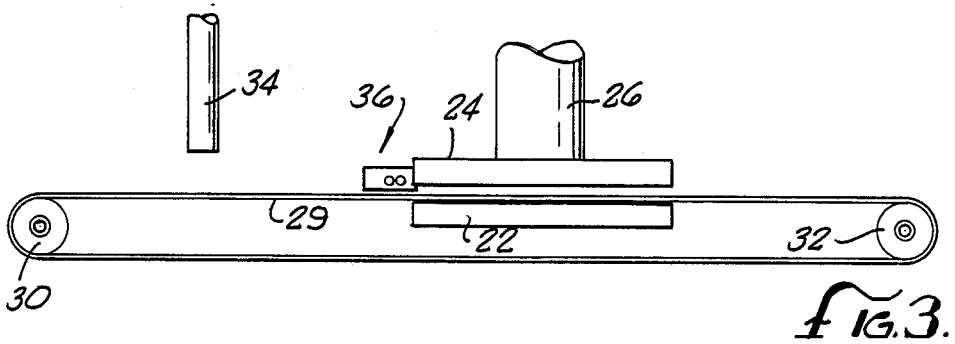
Figure 4:
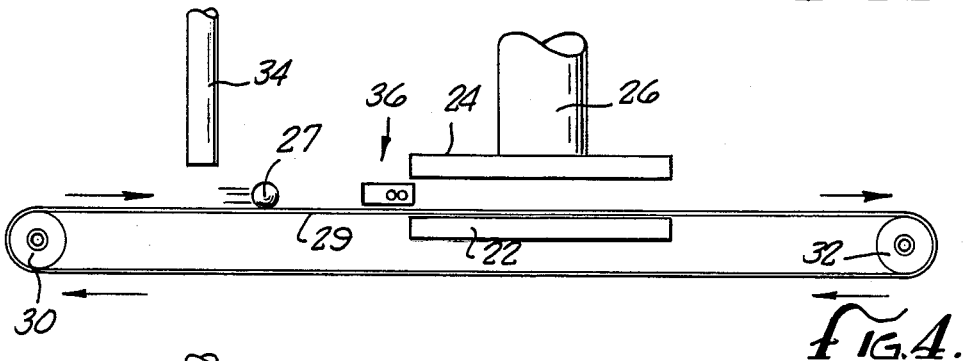
Figure 5:
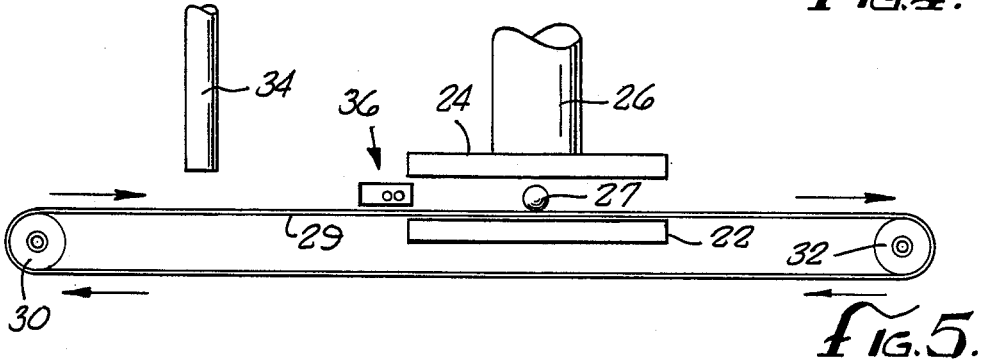

The operation of the described apparatus is as follows. Assuming that the condition of the equipment is such that the movable plate 24 is positioned in its uppermost position and the equipment illustrated in FIG. 7 is in the condition there shown, depression of the START CYCLE switch 64 (FIG. 8) initiates operation of the machine by energizing control relay CR1 in line 59. Control relay CR1 via contacts 68 in line 67, first, arms the photocell sensor 36 and also energizes the DOWN solenoid 44 to cause the plate 24 to move downwardly toward the fixed plate 22 and overlying belt 29. If there has been no doughball issued from transfer tube 34 to the belt 29 for indexing movement toward the processing station (FIG. 2), the photocell 36 will register such absence thereby preventing actuation of control relay CR3 in line 87. Consequently, the DOWN solenoid 44 is deenergized (FIG. 3) upon actuation of the timer 80 due to the energization of control relay CR2 which opens contacts 78 to prevent full downward movement of the plate 24. About one second thereafter, with the timed actuation of the contacts from time delay relay TCR1 effecting closure of contacts 98 in line 95 to energize the UP solenoid and, about 0.2 seconds thereafter, the BELT solenoid 48 upon closure of contacts 102 by the time delay relay TCR2. Thus, the sequence progresses, notwithstanding the fact that the downward movement of the plate 24 has been terminated.

Figure 6:
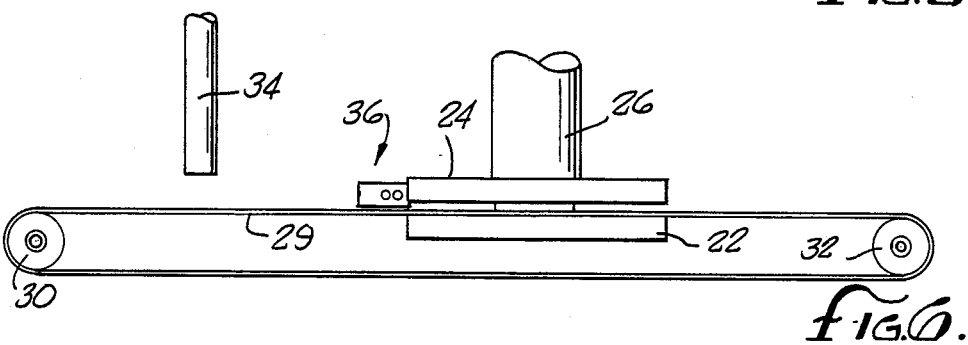

If, on the other hand, the photocell sensor 36 detects the presence of a doughball 27 on the belt 29, by actuation of control relay CR3 through closure of contacts 88, the DOWN solenoid 44 remains energized via closure of contacts 90 and the plate 24 is enabled to proceed through its full doughball compression stroke (FIG. 6). Since the timed sequence of operation of contacts 98 and 102 remains as in the previously described condition, the belt-indexing and the plate-raising sequences are unchanged.

It will be appreciated, therefore, that by means of the present invention there is provided a positive control for a press for producing tortillas, or similar pastry products, to insure that the movable press plate will be permitted to move through a full compressing stroke only when a doughball workpiece is present at the processing position between the plates. Thereby, in no event is the moving plate permitted to contact the conveyor belt and potentially damage it by the application of heat and pressure thereto. Moreover, the control system, by continuing uninterruptedly the indexed longitudinal movement of the belt with respect to the plates and return of the movable plate to its elevated position regardless of whether downward movement of the movable plate has been terminated, insures that the belt will remain stationary on the high temperature fixed plate only for the same length of time as it would were a doughball workpiece to be present thus to insure uniform heating of the belt during all operating conditions of the equipment.

It should be further understood that, although a preferred embodiment of the invention has been illustrated and described herein, changes and modifications can be made in the described arrangement without departing from the scope of the appended claims.

I claim:

1. Apparatus for producing flat pastry products, such as tortillas, from doughball workpieces, comprising:
   a press having a reciprocating plate;
   a conveyor belt operatively positioned with respect to said press to move doughball workpieces to a processing position with respect to said reciprocating plate;
   means for driving said press plate through downward and upward portions of a compressing stroke cycle with respect to said processing position;
   means for moving said conveyor belt with respect to said processing position;
   means upstream of said press plate for sensing the presence of absence of a workpiece on said conveyor belt for delivery to said processing position and actuable to transmit a signal in response thereto; and
   control means for controlling operation of said press plate driving means including means responsive to the signal emitted from said workpiece presence sensing means for interrupting the downward portion of said compressing stroke cycle subsequent to its commencement, and means for initiating movement of said pressure plate through the upward portion of said cycle following such interruption for completion of said cycle when said sensing means indicates the absence of a workpiece from said conveyor belt for delivery to said processing position.

2. Apparatus according to claim 1 in which said conveyor belt is indexed with respect to said press in timed sequence with respect to reciprocation of said press plate and said sensing means is disposed a predetermined distance from said processing position to move the sensed portion of said conveyor belt into said processing position during a compressing stroke cycle.

3. Apparatus according to claim 2 in which said sensing means is a photocell assembly.

4. Apparatus according to claim 3 in which said photocell assembly is positioned to transmit an electron beam transversely of the direction of movement of said conveyor belt adjacent the surface thereof.

5. Apparatus according to claim 2 in which said control means includes means for establishing a period of movement of said press plate during each conveyor belt cycle of movement and said control means being operative to interrupt said compressing stroke cycle intermediate the limits of the downward movement of said press plate.

6. Apparatus according to claim 5 in which said period of movement establishing means includes means permitting downward movement of said press plate at least over a limited extent regardless of actuation of said sensing means and further movement to complete said compressing stroke only when said sensing means has been actuated by the presence of a workpiece.

* * * * *